US006761776B2

(12) United States Patent
Bowlin et al.

(10) Patent No.: US 6,761,776 B2
(45) Date of Patent: Jul. 13, 2004

(54) TORCH CUTTER EXHAUST SYSTEM

(76) Inventors: Paul B. Bowlin, 9601 Lakeway Cir. 6107, Ft. Worth, TX (US) 76179; Bobby P. Bowlin, 4001 Tamworth Rd., Fort Worth, TX (US) 76116

( * ) Notice: Subject to any disclaimer, the term of this patent is extended or adjusted under 35 U.S.C. 154(b) by 29 days.

(21) Appl. No.: 10/010,189

(22) Filed: Dec. 6, 2001

(65) Prior Publication Data

US 2003/0107160 A1 Jun. 12, 2003

(51) Int. Cl.[7] ................................................ B23K 7/08
(52) U.S. Cl. ........................... 148/196; 266/49; 266/67
(58) Field of Search .............................. 266/48, 49, 65, 266/67; 148/194, 196

(56) References Cited

U.S. PATENT DOCUMENTS

| | | | |
|---|---|---|---|
| 4,058,299 A | 11/1977 | Lindkvist | 266/48 |
| 4,350,280 A | 9/1982 | Kruse | 228/29 |
| 4,382,170 A | 5/1983 | Klingel | 215/121 PP |
| 4,441,934 A | 4/1984 | Kawakami | 148/9 R |
| 4,662,117 A | 5/1987 | Korwin et al. | 51/5 R |
| 4,816,637 A | 3/1989 | Sanders et al. | 219/121.59 |
| 5,491,320 A | * 2/1996 | Taylor | 219/137.41 |
| 5,556,559 A | 9/1996 | Bjorkman, Jr. et al. | 219/121.51 |
| 5,734,143 A | 3/1998 | Kawase et al. | 219/121.43 |
| 5,763,852 A | 6/1998 | Brolund et al. | 219/121.44 |
| 6,077,473 A | * 6/2000 | Diedrich et al. | 266/48 |
| 6,222,155 B1 | * 4/2001 | Blackmon et al. | 219/121.39 |

FOREIGN PATENT DOCUMENTS

FR        2533842 A    *  4/1984

OTHER PUBLICATIONS

Letter to Castle Metals from Bob P. Bowlin dated Jan. 26, 2000.
Letter to Castle Metals from Bob P. Bowlin dated Jun. 12, 2000.

* cited by examiner

*Primary Examiner*—Scott Kastler
(74) *Attorney, Agent, or Firm*—Bracewell & Patterson, L.L.P.

(57) ABSTRACT

A torch cutter exhaust system has a torch and an exhaust shroud at least partially encircling a discharge tip of the torch and mounted to the torch for movement therewith. The shroud is a crescent-shaped enclosure having an intake port and an output port. A table is located beneath the torch to support a material while the material is being cut by the torch. A gantry, movably mounted to the table, supports the torch and exhaust shroud. A duct, mounted to the gantry, connects the exhaust shroud with a flexible exhaust hose located alongside the table. The output end of the hose connects to a vacuum source to create low pressure near the discharge tip of the torch. The input end of the exhaust hose moves in unison with the gantry. The exhaust hose is supported by a wheel assembly that moves in response to the motion of the gantry.

18 Claims, 6 Drawing Sheets

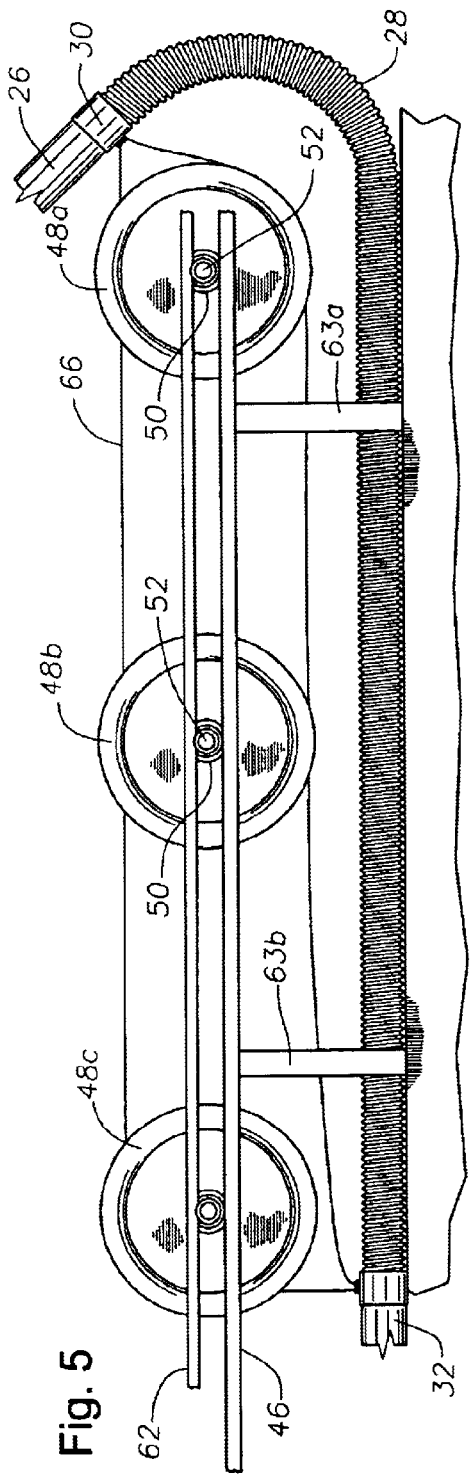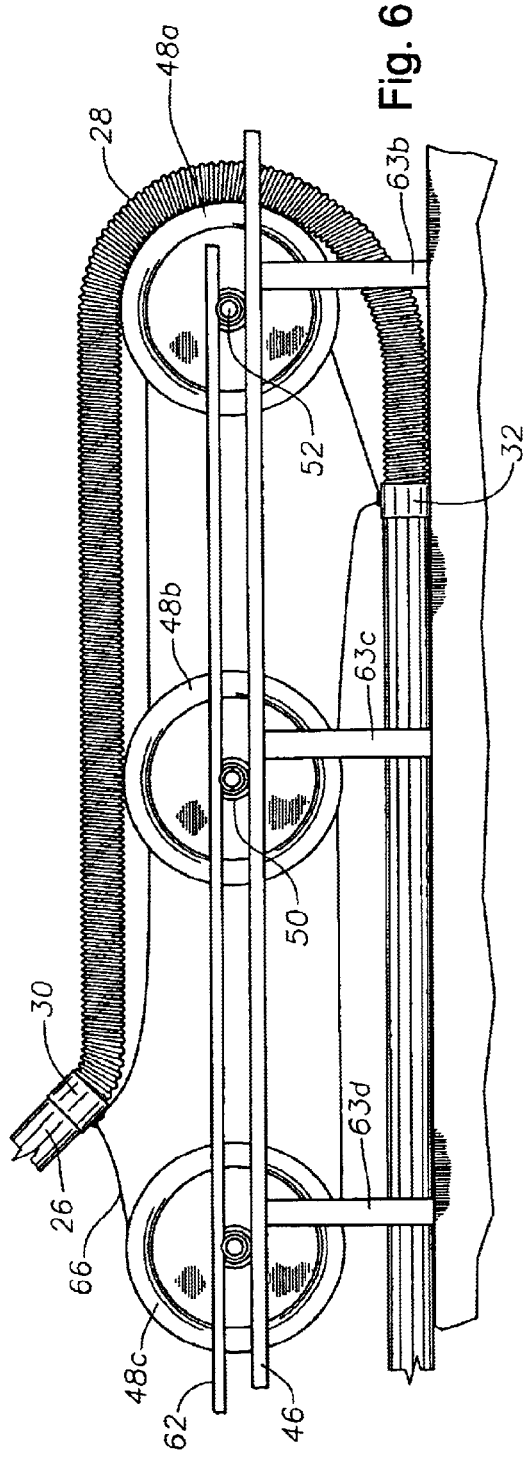

TORCH CUTTER EXHAUST SYSTEM

BACKGROUND OF THE INVENTION

1. Field of the Invention

This invention relates to an exhaust system for torch cutters, and more particularly to an exhaust system for torch cutters having an exhaust shroud that moves with a discharge tip of the torch and an exhaust hose that moves in unison with a gantry to efficiently remove smoke and fumes without adversely affecting the cutting jet of the torch cutter.

2. Description of Prior Art

A wide variety of exhaust systems are currently used to exhaust the fluid debris and gas by-products produced by a torch while cutting stock material. Because of the intense heat produced by the heat jet, much of what comes in contact with the heat jet oxidizes/vaporizes and becomes undesirable fumes or smoke. This is particularly true for plasma torch cutters. While the present invention is not limited to plasma torch cutters, our description will be limited to those for ease of discussion.

In a typical plasma torch cutter application, a piece of stock material is placed on a table having a shallow reservoir whereby the stock material is submerged in water. A torch is usually suspended from a support structure above the table some desired height above the stock material. The torch is then maneuvered two-dimensionally to produce the desired cut.

To remove the potentially hazardous fumes, many approaches have been tried. Increased general ventilation has been tried, but proved inefficient. Such an approach produces drafts and uncomfortable noise levels. Better results are obtained using local ventilation. Certain prior art inventions use stationary ventilators to remove the fumes from a specific region as the torch passes through that region. Those apparatus do a better job than general ventilators, but tend to remove more air than is necessary and can affect the precision of the cut. Local stationary ventilators can also pose an obstacle that must be accounted for in designing the mechanism to move the torch.

Another prior art apparatus associates a suction hood with each torch such that the suction hood moves in concert with the torch and a juxtaposed moveable suction box. While this apparatus offers effective isolation of the region to be evacuated, the coordinated tracking of the torch and hood with the entire suction box is cumbersome. Similarly, a device that allows a moveable hood connected to a vacuum duct that is in sliding connection to a vacuum source, such that the hood and duct can move with the torch, is less than desirable because the sliding seal is difficult to maintain.

SUMMARY OF THE INVENTION

The present invention uses an innovative design to produce a torch cutter exhaust system having a torch and an exhaust shroud at least partially encircling a discharge tip of the torch and mounted to the torch for movement therewith. The exhaust shroud is a crescent-shaped enclosure having an open arcuate wall defining an intake port and an outer arcuate wall having an output port. A table is located beneath the torch to support a stock material while the stock material is being cut by the torch. A gantry, movably mounted to the table, supports the torch and exhaust shroud. A duct, mounted to the gantry, connects the exhaust shroud with a flexible exhaust hose located alongside the table. The output end of the hose connects to a vacuum source to create low pressure near the discharge tip of the torch. The input end of the exhaust hose moving in unison with the gantry. The exhaust hose is supported by a wheel assembly that moves in response to the motion of the gantry.

BRIEF DESCRIPTION OF THE DRAWINGS

So that the manner in which the described features, advantages and objects of the invention, as well as others which will become apparent, are attained and can be understood in detail, more particular description of the invention briefly summarized above may be had by reference to the embodiments thereof that are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings:

FIG. 5 is a side view of the support assembly and exhaust hose of the torch cutter exhaust system of FIG. 1, showing the support assembly and exhaust hose near one end of their full range of motion.

FIG. 6 is a side view of the support assembly and exhaust hose of the torch cutter exhaust system of FIG. 1, showing the support assembly and exhaust hose displaced from the position shown in FIG. 5.

DETAILED DESCRIPTION

Figure 1:
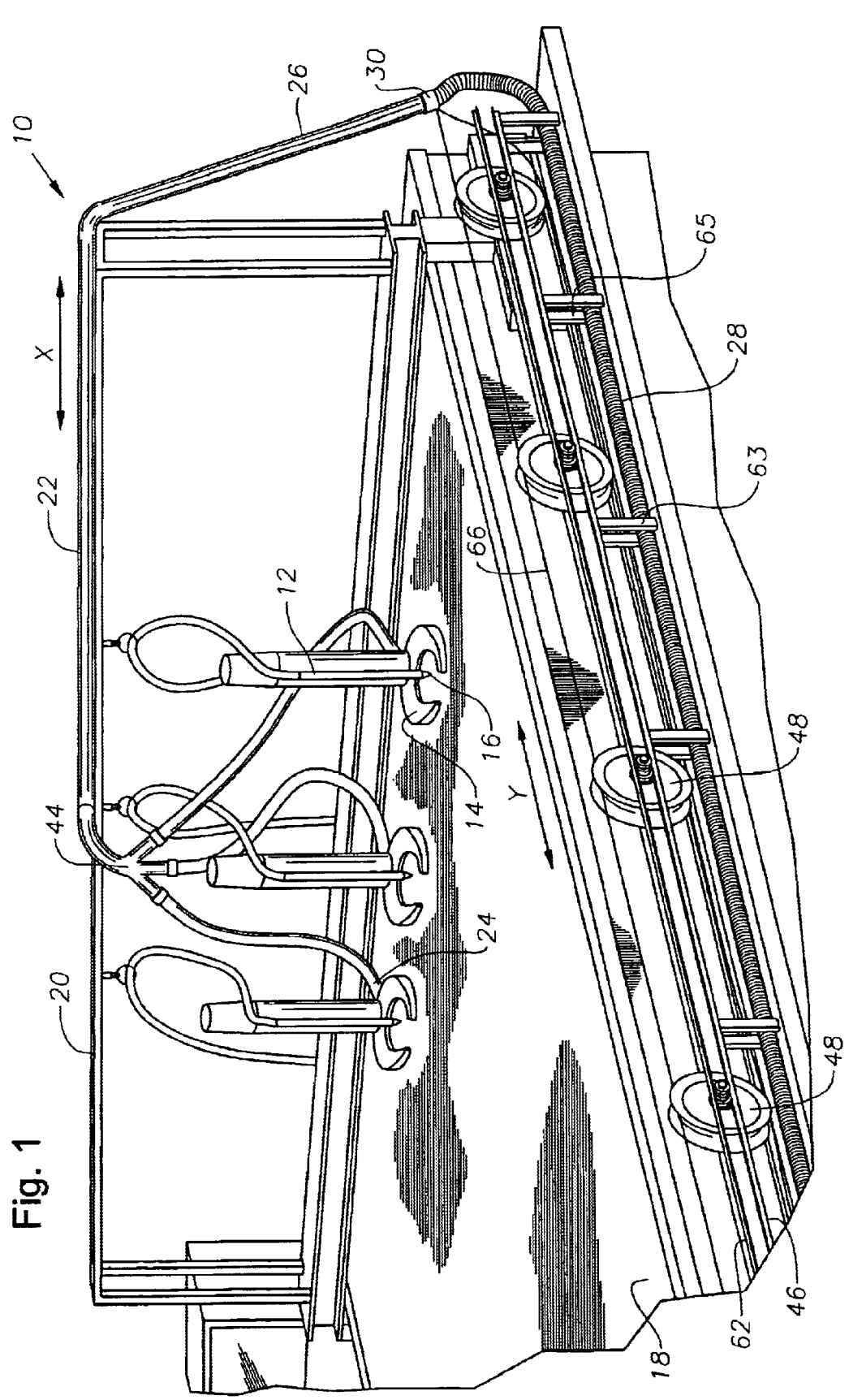
FIG. 1 is a perspective view of a torch cutter exhaust system constructed in accordance with the present invention.

Referring to FIG. 1, torch cutter exhaust system 10 comprises a torch 12 and an exhaust shroud 14 at least partially encircling discharge tip 16 of torch 12, exhaust shroud 14 being mounted to torch 12 for movement therewith. A table 18 is located beneath torch 12 to support a stock material while the stock material is being cut by torch 12. A gantry 20 is movably mounted to table 18 and torch 12 and exhaust shroud 14 are mounted onto gantry 20. A duct 22 is mounted to gantry 20 and has an input end 24, which is a manifold, and an output end 26. The input end 24 of duct 22 is connected to exhaust shroud 14. A flexible exhaust hose 28, located alongside table 18, has an input end 30 connected to output end 26 of duct 22 and an output end 32 (FIG. 5) for connection to a vacuum source (not shown) such that the vacuum source creates a low pressure area in the immediate vicinity of discharge tip 16 of torch 12. The input end 30 of exhaust hose 28 moves in unison with gantry 20. Output end 32 is fixed to the table 18 or the floor and does not move with gantry 20.

Torch 12 can be an oxygen/acetylene torch, but is normally a plasma torch. Plasma torches use a superheated stream of ionized gas issued at high velocity to cut a stock material, and are well known in the art. To actively collect and remove fluid debris such as noxious gases and vaporized matter produced by torch 12, torch cutter exhaust system 10 uses exhaust shroud 14 to communicate a low pressure area in the immediate vicinity of discharge tip 16. The fluid debris flows in response to the low pressure, moving toward exhaust shroud 14. Exhaust shroud 14 is attached to torch 12 so that exhaust shroud 14 moves with torch 12.

Figure 3:
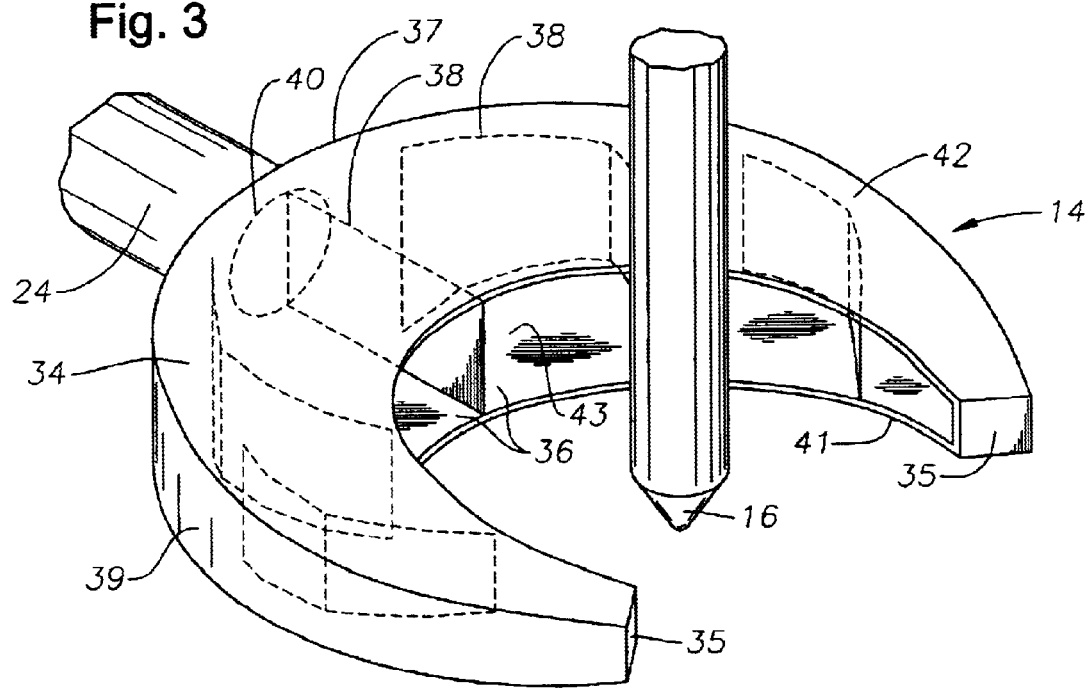
FIG. 3 is an enlarged view of an exhaust shroud of the torch cutter exhaust system of FIG. 1.

Exhaust shroud 14 can be a hollow, fully-surrounding enclosure having at least one input port and an output port, but is preferably a hollow, crescent-shaped body having two tips or free ends 35, as shown in FIG. 3. Enclosure 34 has an arcuate inner opening that defines an input port 36. Baffles 38 extend between lower and upper surfaces 41, 42 within enclosure 34 to direct fluid flow. An output port 40 extends from an arcuate outer surface 39 of enclosure 34 and connects to the input end 24 of duct 22. Fluid flow is directed to output port 40. Enclosure 34 can have an arcuate inner surface on which there are variously-sized input ports 36, or can have one large opening divided by baffles 38 as shown in FIG. 3. Lower and upper surfaces 41, 42 of enclosure 34 may diverge from each other.

In the embodiment of FIG. 3, upper surface 42 is in a plane that is inclined relative to lower surface 41. Also, the arcuate outer surface 39 of enclosure 34 is not coaxial with the arcuate input port 36. The contours of outer surface 39 and input port 36 are selected to produce a lesser distance between them at the two free ends 35 than that between the base 37 at outlet port 40 and a central region 43 of arcuate input port 36. The horizontal cross-section gradually increases from free ends 35 to base 37 at outlet port 40. The vertical cross section also gradually increases from free ends 35 to base 37 at outlet port 40 because of the inclined upper surface 42. This results in a gradually increasing flow area from free ends 35 to outlet port 40.

Preferably the contour of input port 36 is circular with a centerpoint at discharge tip 16. Preferably the contour of outer surface 39 is circular but with its centerpoint offset from discharge tip 16. Outlet port 40 is farther from discharge tip 16 than outer surface 39 at free ends 35.

FIG. 3 shows discharge tip 16 approximately centered in the partially enclosed area of exhaust shroud 14. It is advantageous not to completely enclose discharge tip 16 so as to be able to remove it without removing exhaust shroud 14, but this can introduce an unbalanced flow pattern around discharge tip 16. The imbalance in fluid flow can cause the heat jet to be deflected from its intended cutting location. The gradually increasing flow area of enclosure 34 and the tapered input port 36 reduces this imbalance. The fluid flows faster in the reduced area portion of input port 36 near fee ends 35 than in the greater area portion adjacent outlet port 40. The differing fluid flow rate compensates for the missing portion of exhaust shroud 14 and restores balance.

Figure 3A:
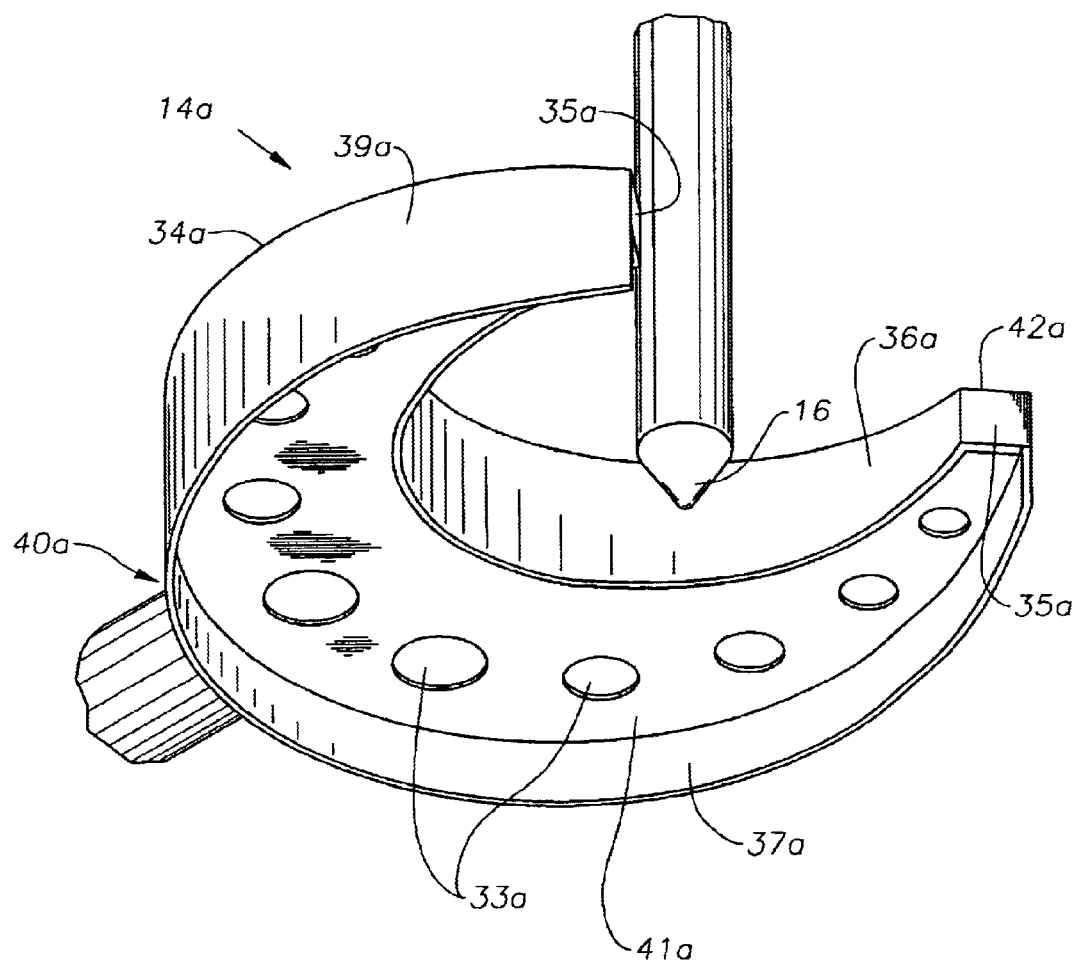
FIG. 3A is an enlarged view of an alternative embodiment of an exhaust shroud of the torch cutter exhaust system of FIG. 1.

As an alternative embodiment, exhaust shroud 14a in FIG. 3A is a hollow, crescent-shaped body having two tips or free ends 35a, but enclosure 34a has no arcuate inner opening such as input port 36 in FIG. 3. Instead, enclosure 34a uses holes 33a in bottom surface 41a as input ports, and has an inner arcuate wall 36a similar to outer arcuate wall 39a. In this embodiment, outer arcuate wall 39a extends below bottom surface 41a, forming a lip 37a. Similar to the embodiment of FIG. 3, the widest portion of upper surface 42a of enclosure 34a is near output port 40a. From there, upper surface 42a tapers smoothly outward to its narrowest portions, near free ends 35a. Free ends 35a are preferably open, but can be closed. Baffles 38 (FIG. 3) may or may not be present in the embodiment of FIG. 3A.

Referring back to FIG. 1, output port 40 of exhaust shroud 14 connects to input end 24 of duct 22. Duct 22 can be a single conduit if there is only one torch 12, or it can have a manifold 44 to accommodate multiple torches 12. In either case, duct 22 forms a passageway for the fluid debris collected by exhaust shroud 14 to flow through. Duct 22 mounts to and moves with gantry 20. Except for its input end 24 and output end 26, duct 22 is flexible to allow torch 12 and exhaust shroud 14 to move from one side to the other of gantry 20, referred to herein as the x-direction.

Gantry 20 is a support structure that spans table 18 and can travel from one end of table 18 to the opposite end in the y-direction. Gantry 20 supports torch 20 and exhaust shroud 14, in addition to duct 22. Torch 12, exhaust shroud 14, and duct input end 24 move with gantry 20 in the y-direction, and are free to move in the x-direction relative to gantry 20 and table 18.

Figure 2:
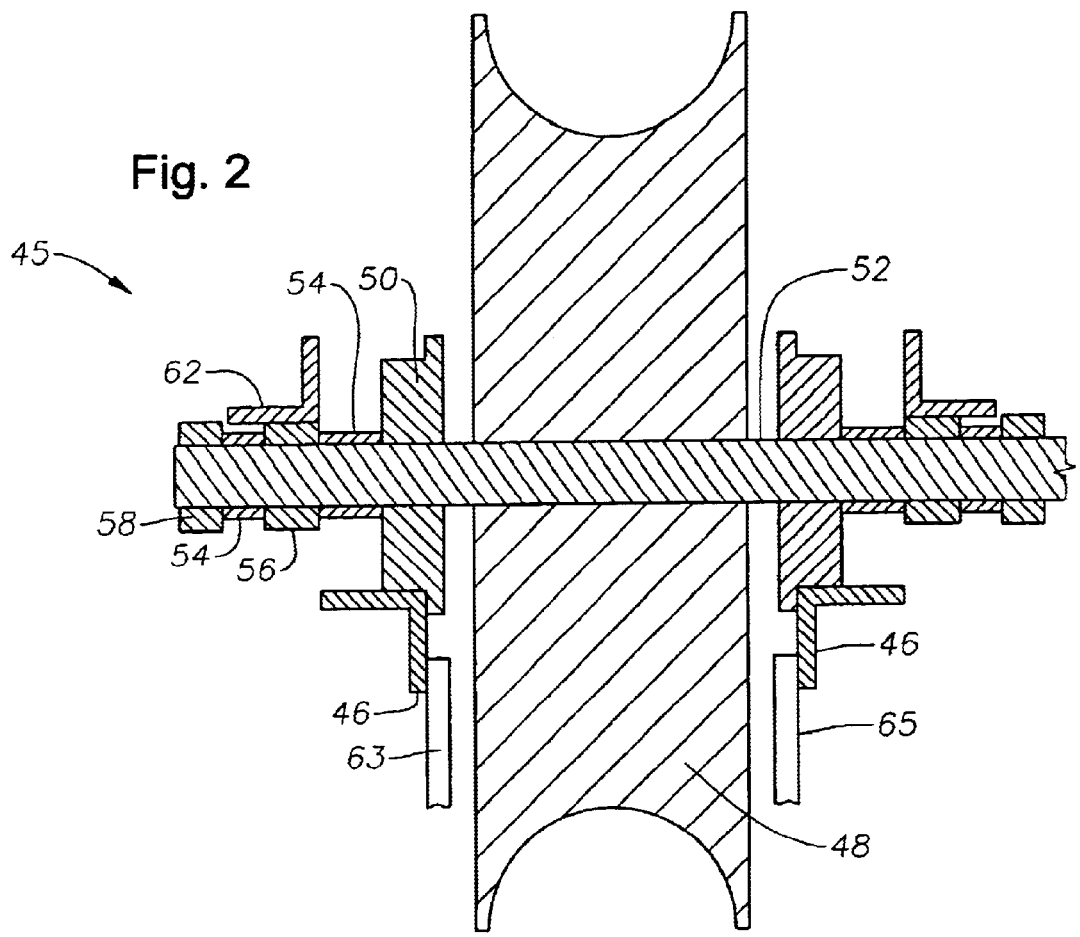
FIG. 2 is a section view of the support assembly of the torch cutter exhaust system of FIG. 1.

Output end 26 of duct 22 is rigidly mounted to gantry 20 and connects to input end 30 of flexible exhaust hose 28. As gantry 20 moves along table 18 in the y-direction, output end 26 of duct 22 and input end 30 of exhaust hose 28 move in unison with gantry 20. This can be a large displacement from one end of table 18 to its opposite end. Thus, exhaust hose 28 must be able to accommodate such large displacements while its output end 32 remains fixed, connected to a vacuum source. To do so, torch cutter exhaust system 10 uses a support assembly 45 (FIG. 2) comprising tracks 46, a wheel or set of wheels 48, and rollers 50 on which wheels 48 are rotatably mounted and carried by tracks 46.

Figure 4:
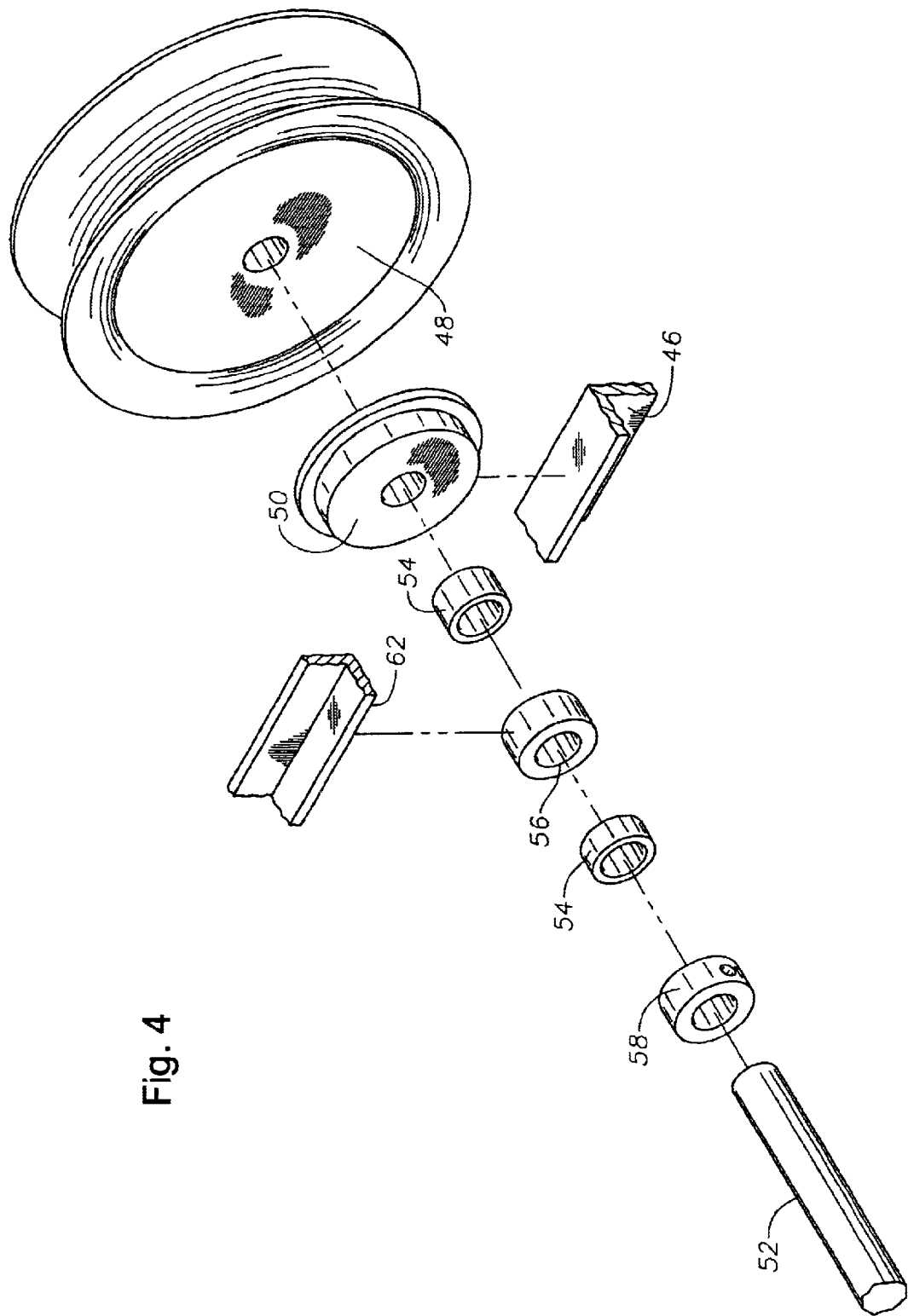
FIG. 4 is an exploded view of a portion of the support assembly of FIG. 2.
Figure 7:
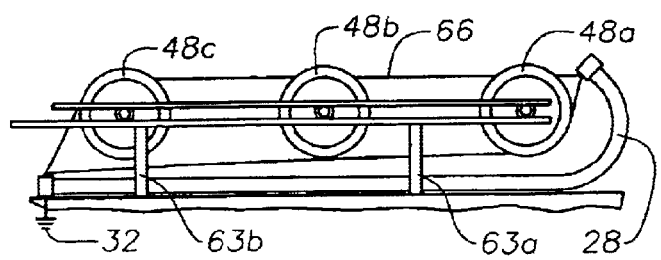
FIGS. 7–11 are a sequential series of schematic side views of the support assembly and exhaust hose of the torch cutter exhaust system of FIGS. 5 and 6, showing the progression from the configuration shown in FIG. 5 to the opposite end of the full range of motion.
Figure 8:
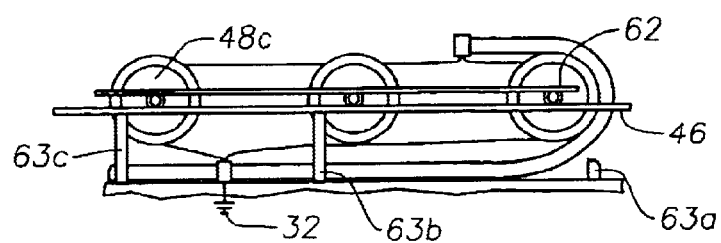
Figure 9:
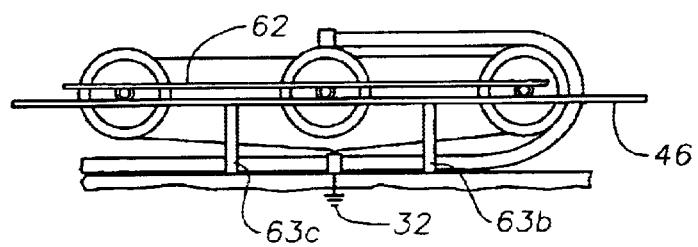
Figure 10:
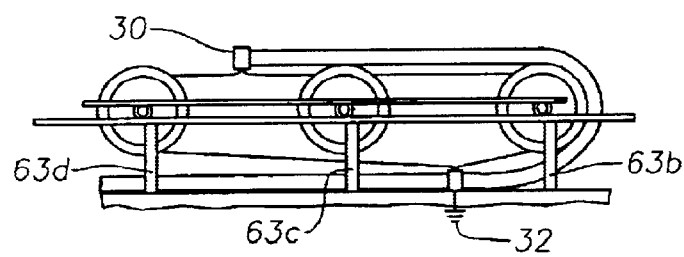
Figure 11:
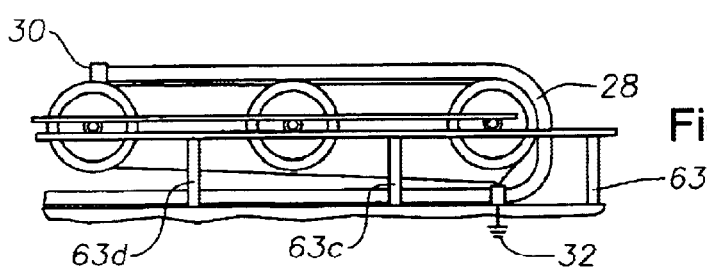

FIG. 4 shows the essential elements of support assembly 45 for a single wheel 48 and roller 50. Wheel 48 is secured to axle 52, preferably in rolling contact, but optionally rigidly attached. Wheel 48 is constrained from sliding along the length of axle 52 but can rotate with or on axle 52. Axle 52 penetrates, along a common axis, roller 50, spacers 54, bearing 56, and retainer 58. Retainer 58 attaches to axle 52 and is constrained from sliding along the length of axle 52. Roller 50 is preferably rotationally attached to axle 52, but may be rigidly attached if wheel 48 is free to rotate on axle 52. In either configuration, roller 50 is constrained from sliding along the length of axle 52. Spacers 54 are preferably free to rotate on axle 52 and maintain a desired spacing between roller 50 and bearing 56, and between bearing 56 and retainer 58. To the extent that spacers 54 rotate relative to retainer 58, bearing 56, or roller 50, they are in sliding contact with those abutting elements. Thus, the distance between retainer 58 and roller 50 is constant.

Tracks 46 are shown as a pair of angle members, each with a horizontal surface and a vertical surface. Rollers 50 roll on the horizontal surfaces of tracks 46. Thus, support assembly 45 allows wheel 48 to travel alongside table 18 in parallel motion with gantry 20 and the connected output end 26/input end 30 of duct 22 and exhaust hose 28, respectively. In the embodiment of FIG. 4, wheels 48 are rotationally attached, via axle 52, to rollers 50 for movement along track 46, the wheels 48 being able to rotate independently of the movement of the rollers 50.

A spacebar 62 extends between each bearing 56. Spacebar 62 is attached to the outer surfaces of bearings 56 and maintains a fixed distance between each wheel 48. Spacebar 62 is shown as an angle member, but it could be configured otherwise.

The length of table 18 generally requires exhaust hose 28 to be very long, and thus requires support assembly 45 to have a set of wheels 48. Wheels 48 are spaced according to the support requirements of exhaust hose 28, and the desired spacing is held fixed by spacebars 62 (FIG. 5). Thus, the set of wheels 48 travel as a unit along and preferably span approximately one-half the length of tracks 46.

Tracks 46 are supported by upright legs 63 (FIG. 1). Guide legs 65 are paired with support legs 63 between legs 63 and table 18. Hose 28 will position itself between each pair of legs 63 and 65. There are no cross braces between legs 63, 65. Consequently, a portion of hose 28 can lift above legs 63, 65 as the assembly of wheels 48 move along track 46.

FIG. 5 shows exhaust hose 28 very near a forward end of its full range of motion. Support legs 63 at that end are labeled 63a and 63b. The support legs at the opposite end are labeled 63c and 63d (FIG. 6). The invention is not limited to four support legs 63 or three wheels 48—the embodiment shown is for ease of illustration only. In the position shown in FIG. 5, none of exhaust hose 28 is supported by wheels 48, designated as 48a, 48b, and 48c. FIG. 6 shows exhaust hose 28 moved toward the opposite end (leg 63d) of its full range of motion from that of FIG. 5. In that position, exhaust hose 28 is supported in multiple locations by wheels 48. As FIGS. 5 and 6 show, a cable 66 attaches to output end 26 of duct 22, loops over wheels 48, attaches to fixed output end 32 of exhaust hose 28, continues to loop under wheels 48, and fastens again to output end 26 of duct 22 to form a closed loop around wheels 48.

When moving from forward leg 63a toward rearward leg 63d, cable 66 engages wheel 48a and pushes the entire wheel assembly toward rearward leg 63d. Neither hose 28 nor cable 66 elongates while moving along track 46. Cable 66 assists wheels 48 to move along track 46 in response to the motion of input end 30 of exhaust hose 28. Thus, as input end 30 of exhaust hose 28 moves, cable 66 engages wheels 48 to track that motion. Cable 66 prevents loading on exhaust hose 28 that would otherwise occur if hose 28 were used to move wheels 48. More importantly, cable 66 causes exhaust hose 28 to ride over and onto wheels 48 as input end 30 of exhaust hose 28 moves from the configuration shown in FIG. 5 to that shown in FIG. 6. FIGS. 7–11 illustrate how exhaust hose 28 rides over and onto wheels 48 in "snapshot" fashion. Throughout the movement of input end 30 of exhaust hose 28, output end 32 of exhaust hose 28 remains fixed relative to table 18 (or the floor on which it rests). While moving in a reverse motion toward forward leg 63a, cable 66 will engage the most rearward wheel 48c and push the wheel assembly back toward forward leg 63a.

Track 46 may extend slightly past the rearward end of table 18 so that forward end wheel 48a is located near the midpoint end of table 18 while gantry 20 is in the most rearward position. Wheel 48c will be near the rearward end of table 18 in this position. In the embodiment shown, fixed outlet end 32 is located at the approximate midpoint of table 18 adjacent leg 63b.

During cutting operations, gantry 20 moves along table 18 to move torch 12 over the desired cutting path. Exhaust shroud 14 moves with torch 12, collecting fluid debris as it is produced. Duct 22 moves with gantry 20 and transfers the fluid debris from exhaust shroud 14 to exhaust hose 28. The input end 30 of exhaust hose 28 moves in unison with gantry 20. Flexible exhaust hose 28 moves parallel to table 18, being supported by moving support assembly 45 as input end 30 of exhaust hose 28 is pulled toward or away from fixed output end 32 of exhaust hose 28.

The present invention offers many advantages over the prior art. The exhaust shroud provides a balanced vacuum intake, not disturbing the heat jet. By tracking the torch, the exhaust shroud is very efficient compared to general ventilation. The present invention offers better maneuverability and cut precision than stationary local vacuum hoods. The flexible exhaust hose used in conjunction with the support assembly is superior to those designs using a moving vacuum source or a stationary vacuum with a sliding conduit that must be sealed to maintain the vacuum.

While the invention has been particularly shown and described with reference to a preferred and alternative embodiments, it will be understood by those skilled in the art that various changes in form and detail may be made therein without departing from the spirit and scope of the invention.

What is claimed is:

1. A torch cutter exhaust system comprising:
   a torch;
   an exhaust shroud partially encircling a discharge tip of the torch and mounted to the torch for movement therewith, the exhaust shroud having a hollow, crescent-shaped body with an intake port and an output port, the body having a base and two spaced apart free ends, with an opening between the free ends to provide access to the torch;
   a table located beneath the torch to support a stock material while the stock material is being cut by the torch;
   a gantry movably mounted to the table and onto which the torch and exhaust shroud are mounted;
   a duct mounted to the gantry and having an input end and an output end, the input end of the duct being connected to the output port of the exhaust shroud; and
   a flexible exhaust hose located alongside the table having an input end connecting to the output end of the duct and an output end for connection to a vacuum source such that the vacuum source creates a low pressure area in the immediate vicinity of the discharge tip of the torch, the input end of the exhaust hose moving in unison with the gantry.

2. The torch cutter exhaust system of claim 1 the body has a flow area that gradually increases from the free ends to the base.

3. The torch cutter exhaust system of claim 1 wherein the exhaust shroud has an inner arcuate surface, an outer arcuate surface, an upper surface, a lower surface containing the intake port, and wherein the output port is on the outer arcuate surface of the enclosure.

4. The torch cutter exhaust system of claim 1 wherein the intake port comprises a plurality of intake ports at the arcuate inner surface of the body, the intake ports being defined by baffles within the enclosure to direct fluid flow.

5. The torch cutter exhaust system of claim 1 wherein the intake port comprises an arcuate inner opening, and wherein the discharge tip of the torch is approximately equidistant from the arcuate inner opening of the body.

6. The torch cutter exhaust system of claim 1 in which the body of the exhaust shroud comprises:
   an upper surface, and a lower surface, the upper and the lower surfaces joining the free ends and the base; and
   in which
   the upper and lower surfaces diverge from each other from the free ends to the base.

7. The torch cutter exhaust system of claim 1 in which the body of the exhaust shroud comprises:
   an upper surface, and a lower surface that increase in width from the free ends to the base.

8. The torch cutter exhaust system of claim 1 further comprising:
   a track alongside the table;
   a roller carried for rolling movement along the track;

a wheel rotationally attached to the roller for movement along the track, the wheel being rotatable independently of the movement of the roller; and a cable loop attached to the input end of the exhaust hose and the output end of the exhaust hose, and passing over the wheel such that a portion of the cable and a portion of the exhaust hose are partially supported by the wheel as the gantry moves from one end of the table to the opposite end.

9. The torch cutter exhaust system of claim 1 further comprising:

a track alongside the table;

a plurality of rollers carried for rolling movement along the track;

a corresponding plurality of wheels rotationally attached to the rollers for movement along the track, the wheels being rotatable independently of the movement of the rollers; and a cable loop attached to the input end of the exhaust hose and the output end of the exhaust hose, which is adapted to be fixed, and passing over the wheels such that a portion of the cable and a portion of the exhaust hose are partially supported by the wheels as the gantry moves from one end of the table to the opposite end.

10. An exhaust shroud to capture fluid debris produced by a torch cutter comprising:

a generally crescent-shaped hollow enclosure having an inner arcuate surface, the inner arcuate surface adapted to partially surround a discharge tip of a torch, the enclosure having a base and two free ends that are spaced apart from each other to provide access to the torch cutter;

a plurality of input ports alone the enclosure from the free ends to the base; and an output port on the enclosure for connection to a duct.

11. The exhaust shroud of claim 10 wherein the input ports are separated from each other by baffles within the hollow enclosure to direct fluid flow to the output port.

12. The exhaust shroud of claim 10 in which:

the output port is connected to the base, and the enclosure has a gradually increasing flow area from the free ends to the base.

13. The exhaust shroud of claim 10, wherein the enclosure comprises:

an upper surface, a lower surface that contains the input ports, and an arcuate outer wall that contains the output port;

the upper and the lower surfaces joining the free ends and the base; and wherein the upper and lower surfaces diverge from each other from the free ends to the base.

14. The exhaust shroud of claim 10 wherein the enclosure comprises:

an arcuate outer wall that contains the output port;

the inner arcuate inner surface defining a central region, and wherein the distance between the arcuate outer wall and the inner arcuate surface at the free ends is less than the distance between the arcuate outer wall and the inner arcuate surface at the central region.

15. The exhaust shroud of claim 10 in which the enclosure comprises:

an arcuate outer wall in which the output port is located;

an upper surface, and a lower surface, the upper and the lower surfaces joining the free ends and the base, and wherein the upper and lower surfaces diverge from each other from the free ends to the base;

the inner arcuate surface defining a central region; and wherein the distance between the arcuate outer wall and the inner arcuate surface at the free ends is less than the distance between the arcuate outer wall and the inner arcuate surface at the central region.

16. A moveable exhaust assembly for a torch cutter comprising:

a support platform;

a gantry moveably mounted to the support platform;

an exhaust shroud carried by the gantry for collecting exhaust from a torch;

a conduit mounted to the gantry to move therewith, and having an intake end connected to the exhaust shroud and a discharge end;

a flexible exhaust hose having an intake end and a discharge end, the intake end of the exhaust hose being connected to the discharge end of the conduit, the discharge end of the exhaust hose being fixed relative to the support platform;

a track alongside the support platform;

a plurality of rollers moveably mounted to the track;

a plurality of wheels each rotationally attached to one of the rollers such that each of the wheels can rotate independent of the movement of the rollers along the track;

a plurality of spacebars, each located between two of the rollers to fix a distance between the rollers; and a cable loop attached to the intake end of the exhaust hose and the discharge end of the exhaust hose, and passing over the wheels such that a portion of the cable and a portion of the exhaust hose are partially supported by the wheels as the gantry moves from one end of the table to the opposite end.

17. A method of exhausting fluid debris from a region of space proximately surrounding a moving discharge tip of a torch, comprising the steps of:

at least partially encircling the discharge tip of the torch with an exhaust shroud;

connecting the exhaust shroud, a conduit, and a flexible exhaust hose in series to a vacuum source;

supporting a stock material with a support platform located beneath the torch while the stock material is being cut by the torch;

moving a gantry, onto which the torch and exhaust shroud are mounted, over the support platform;

creating with the vacuum source a low pressure area in the immediate vicinity of the discharge tip of the torch via the exhaust shroud, the conduit, and the exhaust hose, the conduit and an input end of the exhaust hose moving in unison with the gantry; and supporting the exhaust hose with a set of wheels rotationally mounted to a corresponding set of rollers, the rollers being spaced a fixed distance apart and free to travel on a track.

18. The method of claim 17 further comprising the step of using a cable loop attached to the input end of the exhaust hose and an output end of the exhaust hose to move the exhaust hose onto the wheels.

* * * * *